United States Patent [19]

Iida et al.

[11] Patent Number: 5,278,125
[45] Date of Patent: Jan. 11, 1994

[54] SUPPORT STRUCTURE FOR AN EXHAUST GAS PURIFYING CATALYST

[75] Inventors: Kiyomi Iida, Nagoya; Gozo Kaji, Aichi; Norio Yamagishi, Toyota; Keizo Tanaka, Aichi, all of Japan

[73] Assignee: Toyota Jidosha Kabushiki Kaisha, Toyota, Japan

[21] Appl. No.: 985,873

[22] Filed: Dec. 4, 1992

[30] Foreign Application Priority Data

Dec. 25, 1991 [JP] Japan .................. 3-342871
Aug. 19, 1992 [JP] Japan .................. 4-220098

[51] Int. Cl.$^5$ .................. B01J 32/00; B01J 35/04
[52] U.S. Cl. .................. 502/439; 502/527; 428/116; 428/593
[58] Field of Search .................. 502/439, 527; 428/593

[56] References Cited

U.S. PATENT DOCUMENTS 4,988,483 1/1991 Usui et al. .................. 502/527 X

FOREIGN PATENT DOCUMENTS 3939490 6/1990 Fed. Rep. of Germany ...... 502/527
63-141632 9/1988 Japan .
01-111124 7/1989 Japan .
0276118 6/1990 Japan .
0283320 6/1990 Japan .

*Primary Examiner*—W. J. Shine
*Attorney, Agent, or Firm*—Oblon, Spivak, McClelland, Maier & Neustadt

[57] ABSTRACT

A tandem support structure for an exhaust gas purifying catalyst comprises a sleeve, a first honeycomb disposed on an upstream side of exhaust gases, and a second honeycomb disposed on a downstream side of exhaust gases at a position axially separated from the first honeycomb. The second honeycomb is fixed to the sleeve, and the first honeycomb is held by a holding member which axially extends in an upstream direction from said second honeycomb, without contacting the sleeve. Since an air layer exists between the first honeycomb and the sleeve, heat radiation from the first honeycomb is prevented and temperature rising characteristics of the first honeycomb are improved.

10 Claims, 6 Drawing Sheets

1. SLEEVE
2. FIRST HONEYCOMB
3. SECOND HONEYCOMB
4. HOLDING MEMBER

SUPPORT STRUCTURE FOR AN EXHAUST GAS PURIFYING CATALYST

BACKGROUND OF THE INVENTION

1. Field of the Invention

This invention relates to a support structure used for a catalyst for purifying exhaust gases of an internal combustion engine, and in particular to a tandem support structure for an exhaust gas purifying catalyst in which two or more honeycombs are disposed in a sleeve.

2. State of the Art

As a catalyst for purifying exhaust gases of an automobile engine, it is common to use a catalyst in which a catalyst carrier comprising activated alumina or the like is formed on a ceramic or metallic honeycomb, and catalyst metal comprising platinum or rhodium is loaded on the catalyst carrier.

The catalyst metal, however, cannot exhibit catalyst activity at temperatures of less than 300° C. Since the temperature of the honeycomb is low immediately after the engine starts, harmful substances are exhausted with almost no purification until the honeycomb is heated and reaches a temperature of 300° C. or more by the heat of the exhausted gases.

In order to improve this matter, it has become common to employ a honeycomb made of metal which is superior in heat conductivity and temperature rising characteristics to ceramics. Further, Japanese Unexamined Utility Model Publication (KOKAI) No. 141632/1988 and No. 83320/1990 disclose a tandem support structure where two honeycombs are fixed at positions separated from each other in a sleeve, and the metal honeycomb in small volume is disposed on an upstream side of exhaust gases, while the ceramic or metal honeycomb is disposed on an downstream side of the exhaust gases. The reduction of the heat capacity of the honeycomb on the upstream side allows the temperature of the honeycomb on the upstream side to rise rapidly. Besides, catalyst design freedom is increased. For example, it becomes possible to load a larger quantity of catalyst metal which exhibits high activity at low temperatures on the honeycomb on the upstream side.

Further, the above publications and Japanese Utility Model Publication (KOKAI) No. 111124/1989 disclose a support structure in which a metal honeycomb makes only a partial contact with a sleeve, and a support structure in which a metal honeycomb is fixed to a sleeve by way of a heat insulating cushioning material. The employment of these support structures prevents heat radiation caused by the heat transmission between the metal honeycomb and the sleeve. Therefore, the rise of the metal honeycomb temperature is promoted, and the capacity of purifying exhaust gases at the beginning of an engine operation is increased.

Even the tandem support structures described in the above, however, do not have sufficient capacity of purifying exhaust gases at low temperatures immediately after an engine starts, because of the following problems: Even when the metal honeycomb having small heat capacity is disposed on the upstream side of exhaust gases, heat radiates due to the heat transmission at connecting parts of the metal honeycomb and the sleeve. Further, the heat insulating cushioning material has problems in heat resistance and durability in itself, and therefore can be used only for very limited parts. In addition, the employment of the heat insulating cushioning material causes the increase in the whole size of the support structure, production costs, and required space for installing the support structure.

SUMMARY OF THE INVENTION

The present invention has been developed in view of the aforesaid circumstances. It is therefore an object of the present invention to prevent heat radiation from metal honeycombs more effectively without using any heat insulating cushioning material.

A tandem support structure for an exhaust gas purifying catalyst according to the present invention comprises a sleeve, a first honeycomb disposed on an upstream side of exhaust gases in the sleeve, a second honeycomb disposed on a downstream side of the exhaust gases and at a position axially separated from the first honeycomb in the sleeve, wherein the second honeycomb is fixed to the sleeve at least at a part thereof, and the first honeycomb is held by a holding member which axially extends in an upstream direction from the second honeycomb, without contacting the sleeve.

In a catalyst for purifying exhaust gases using the support structure according to the present invention, first exhaust gases flow into the first honeycomb. The first honeycomb is held without contacting the sleeve, and has a pipe-shaped air layer between itself and the sleeve. Since the air layer functions as a heat insulating layer and prevents heat radiation caused by the heat transmission from the first honeycomb, the first honeycomb absorbs the heat of exhaust gases and its temperature rapidly rises. Thus, the capacity of purifying exhaust gases at the beginning of an engine operation is improved.

The exhaust gases having passed through the first honeycomb then flow into the second honeycomb. Since the first honeycomb and the second honeycomb are disposed at positions separated from each other, the exhaust gases having passed through the first honeycomb are stirred and flow into the second honeycomb as turbulence. Therefore, the exhaust gases are purified almost uniformly.

Since catalyst reaction heat within the first honeycomb is added to the original heat of the exhaust gases, the exhaust gases having passed through the first honeycomb are at higher temperatures. Therefore, the temperature of the second honeycomb rapidly rises, and further purification of the exhaust gases are promoted. Although the second honeycomb is fixed in contact with the sleeve, heat radiation from the second honeycomb through the sleeve does not affect the exhaust gas purifying capacity, because the capacity of purifying exhaust gases immediately after an engine starts depends on the temperature rising speed of the first honeycomb.

In summary, in the support structure for an exhaust gas purifying catalyst according to the present invention, the first honeycomb is excellent in temperature rising characteristics. Therefore, efficiency of purifying exhaust gases immediately after an engine starts is remarkably improved when the supports of the present invention is installed on an exhaust pipe of an automobile.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Having generally described the present invention, a further understanding can be obtained by reference to certain specific preferred embodiments and comparative examples. The preferred embodiments are provided herein for purpose of illustration only and are not intended to be limiting unless otherwise specified.

PREFERRED EMBODIMENT 1

Figure 1:
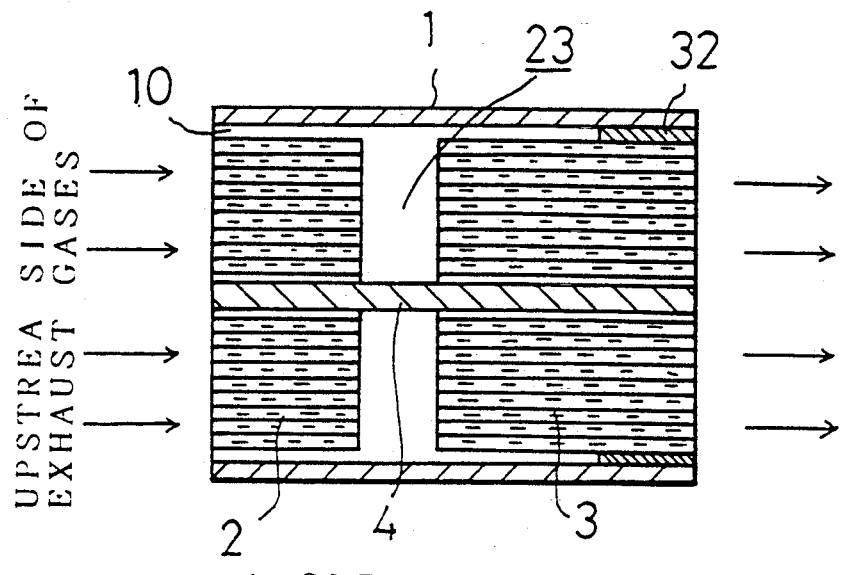
FIG. 1 is a cross section of a support structure of a first preferred embodiment according to the present invention.
Figure 2:
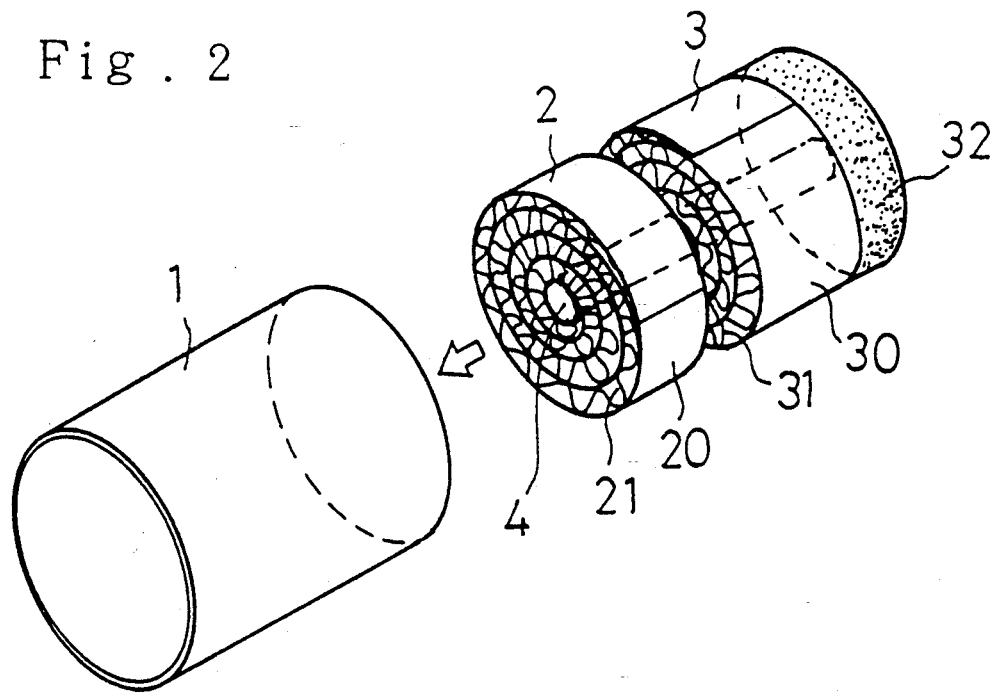
FIG. 2 is a perspective side view of the support structure of the first preferred embodiment according to the present invention.

FIGS. 1 and 2 show a support structure of an exhaust gas purifying catalyst of a first preferred embodiment according to the present invention. This support structure comprises a sleeve 1, a first honeycomb 2 and a second honeycomb 3 which are disposed in the sleeve 1, and a holding member 4 connecting the first honeycomb 2 and the second honeycomb 3.

The sleeve 1 is formed of ferrite stainless steel of 1 to 2 mm in thickness, and has a cylindrical shape having an inner diameter of 85 mm.

Both the first honeycomb 2 and the second honeycomb 3 comprise flat foil plates 20, 30 formed of a heat resisting alloy such as Fe-20Cr-5Al-rare earth metal (Y, La, or the like) and having a thickness of 50 microns, and corrugated plates 21, 31 formed by corrugating those flat foil plates 20, 30. The first honeycomb 2 and the second honeycomb 3 are formed by piling the flat plates 20, 30 and the corrugated plates 21, 31 and winding them together in rolls. The diameter of the first honeycomb 2 is 84 mm, and that of the second honeycomb 3 is 84.9 mm. The axial length of the first honeycomb 2 is 20 mm, and that of the second honeycomb 3 is 100 mm. So, the first honeycomb 2 is shorter than the second honeycomb 3.

The holding member 4 has a rod shape and is formed of ferrite stainless steel. Ends of the holding member 4 are fixed respectively to centers of the first honeycomb 2 and the second honeycomb 3. The first honeycomb 2 and the second honeycomb 3 are fixed to the holding member 4 at a distance 23 of 10 mm from the first honeycomb 2 to the second honeycomb 3.

Solder 32 is applied annularly on an end of the second honeycomb 3 opposite to the first honeycomb 2, and that end of the second honeycomb 3 is fixed to the inner circumferential surface of one end of the sleeve 1 by that solder 32. The first honeycomb 2 is disposed in the other end of the sleeve 1 in a way not to contact the inner circumferential surface of the sleeve 1. Namely, a pipe-shaped gap 10 is formed between the outer circumferential surface of the first honeycomb 2 and the inner circumferential surface of the sleeve 1. Since the width of the gap 10 is as small as approximately 0.5 mm, exhaust gases are suppressed from passing through the gap 10 and flowing away without being purified.

Figure 3:
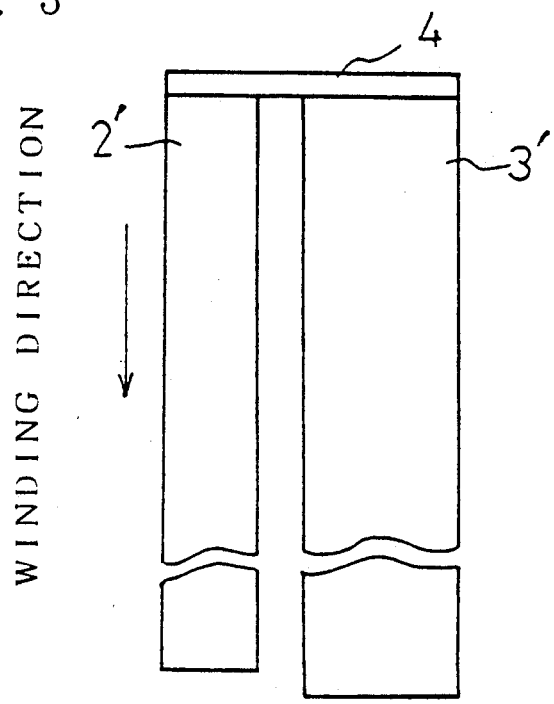
FIG. 3 is a development elevation of honeycombs used in the first preferred embodiment according to the present invention.

The first honeycomb 2, the second honeycomb 3 and the holding member 4 can be integrally formed. For example, as shown in FIG. 3, foil materials 2' and 3' which respectively comprise a flat plate and a corrugated plate piled on the flat plate are disposed in parallel with each other at the above described distance 23. Then, the holding member 4 is connected to one end of each of the foil materials 2' and 3', and the foil materials 2' and 3' are wound around the holding member 4. It is possible to form the first honeycomb 2 and the second honeycomb 3 separately and then insert the holding member 4 in the centers of the first honeycomb 2 and the second honeycomb 3. This production method, however, requires more production steps and, accordingly, is inferior to the above method in productivity.

The above support structure is made into a catalyst by forming an activated alumina layer on the surface of cells of the respective honeycombs by a known method, and charging catalyst metal such as platinum on the activated alumina by a conventional method.

The catalyst is installed in a catalytic converter (not shown) in such a manner to place the first honeycomb 2 on an upstream side of exhaust gases. First, exhaust gases flow into the first honeycomb 2, and the heat of the exhaust gases raises the temperature of the first honeycomb 2. Here, the gap 10 is formed in the circumference of the first honeycomb 2. Therefore, an air layer in the gap 10 serves as a heat insulating layer, and suppresses heat radiation from the first honeycomb 2. Besides, the first honeycomb 2 has a smaller volume than the second honeycomb 3, and accordingly has a smaller heat capacity than the second honeycomb 3. Owing to these facts, the temperature of the first honeycomb 2 rapidly increases above the activation temperature of the catalyst metal, and the first honeycomb purifies the exhaust gases.

The exhaust gases having passed through the first honeycomb 2 have higher temperatures than before because the reaction heat of the catalyst reaction has been added to the original heat of the exhaust gases, and flow into the second honeycomb 3. Since the first honeycomb 2 and the second honeycomb 3 are separated from each other by a space 23, the exhaust gases which flow out of the first honeycomb 2 are made turbulent in space 23. Since the exhaust gases which flow out of the cells at the center of the first honeycomb 2 are mixed with the exhaust gases which flow out of the cells at the periphery of the first honeycomb 2, the entire exhaust gases have a uniform temperature and composition, and flow into the second honeycomb 3. The exhaust gases are further purified by the second honeycomb 3 and flow out of the second honeycomb 3.

The holding member 4 is a solid rod, and fills air holes which are inevitably produced at the centers of the honeycombs when the foil materials are wound without the holding member 4. Therefore, unpurified exhaust gases are prevented from going through the air holes and flowing away.

The support structure of this preferred embodiment according to the present invention was installed in an exhaust pipe of a 2.0 liter gasoline engine. Exhaust gases at a temperature of 300° C. were introduced into and passed through the supports, and the temperature of the outermost layer of the first honeycomb 2 on the upstream side was measured continuously for 90 seconds. The results are shown in FIG. 4.

COMPARATIVE EXAMPLE 1

A support structure of Comparative Example 1 was produced without using the holding member 4. A first honeycomb 2 and a second honeycomb 3 were disposed in a sleeve 1 in a similar way to Preferred Embodiment 1. The second honeycomb 3 was fixed to the sleeve 1 by solder in the same way as Preferred Embodiment 1, while the entire outer circumferential surface of the first honeycomb 2 was fixed to the sleeve 1 by solder.

Figure 4:
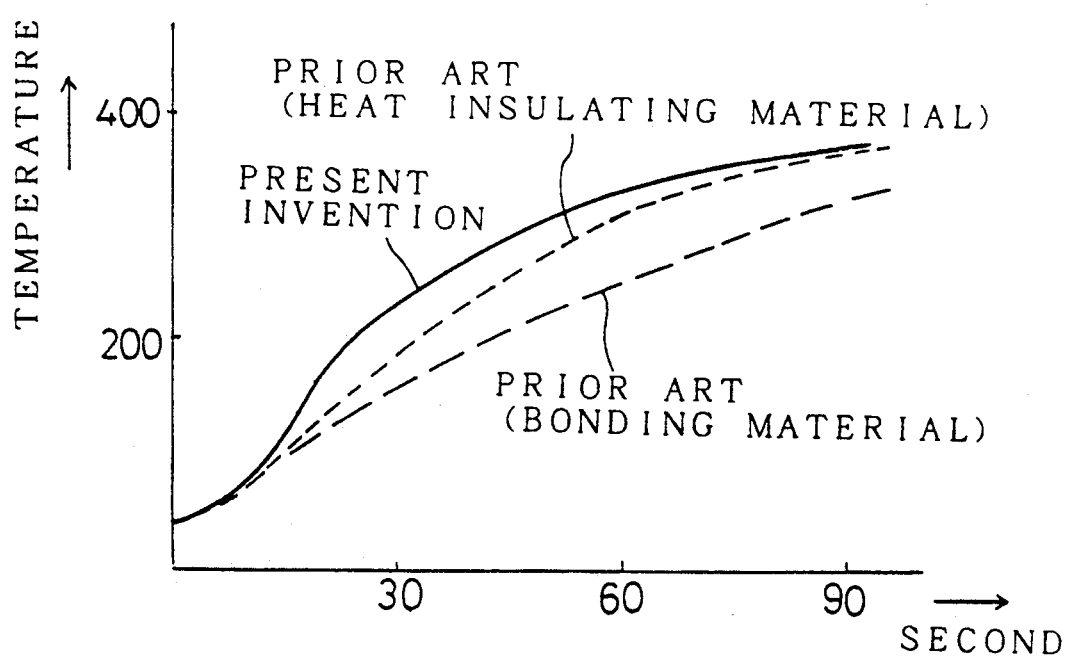
FIG. 4 is a graph showing temperature rising characteristics of the support structure of the first preferred embodiment.

The temperature of the support on an upstream side of Comparative Example 1 at the initial operation was measured in a similar way to Preferred Embodiment 1, and the results are also shown in FIG. 4.

COMPARATIVE EXAMPLE 2

A support structure of Comparative example 2 was produced in a similar way to that of Comparative Example 1 except that the first honeycomb 2 and the second honeycomb 3 are fixed to the sleeve 1 by way of a heat insulating material of 3 mm in thickness instead of using solder. The heat insulating material was a heat expansive ceramic comprising alumina-silica ceramic fibers, vermiculite as a heat expanding agent, and organic binders.

The temperature of the support on an upstream side at the initial operation was also measured in a similar way to Preferred Embodiment 1, and the results are shown in FIG. 4.

EVALUATION

FIG. 4 shows that the support of Preferred Embodiment 1 is high in initial temperature rising speed and has superior temperature rising characteristics. On the other hand, the support of Comparative Example 2 has a superior temperature rising characteristics to that of Comparative Example 1 owing to the heat insulating material, but is inferior in initial temperature rising characteristics to Preferred Embodiment 1.

PREFERRED EMBODIMENT 2

Figure 5:
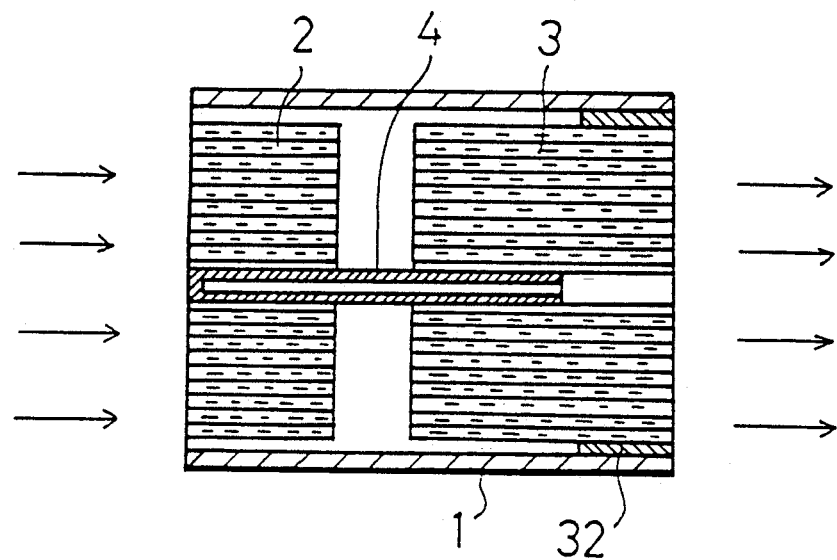
FIG. 5 is a cross section of a support structure of a second preferred embodiment according to the present invention.

FIG. 5 shows a cross section of a support structure of a second preferred embodiment. The support structure was produced to have a similar structure to that of Preferred Embodiment 1 except that a holding member 4 is a hollow cylindrical rod having a bottomed end and a part of the holding member 4 disposed in a second honeycomb 3 has a smaller length than that of Preferred Embodiment 1.

Since the holding member 4 of this preferred embodiment is hollow and has a small length, the holding member 4 has a smaller heat capacity to that of Preferred Embodiment 1. Therefore, the temperature rising characteristics of the first honeycomb 2 and the second honeycomb 3 are further enhanced.

PREFERRED EMBODIMENT 3

Figure 6:
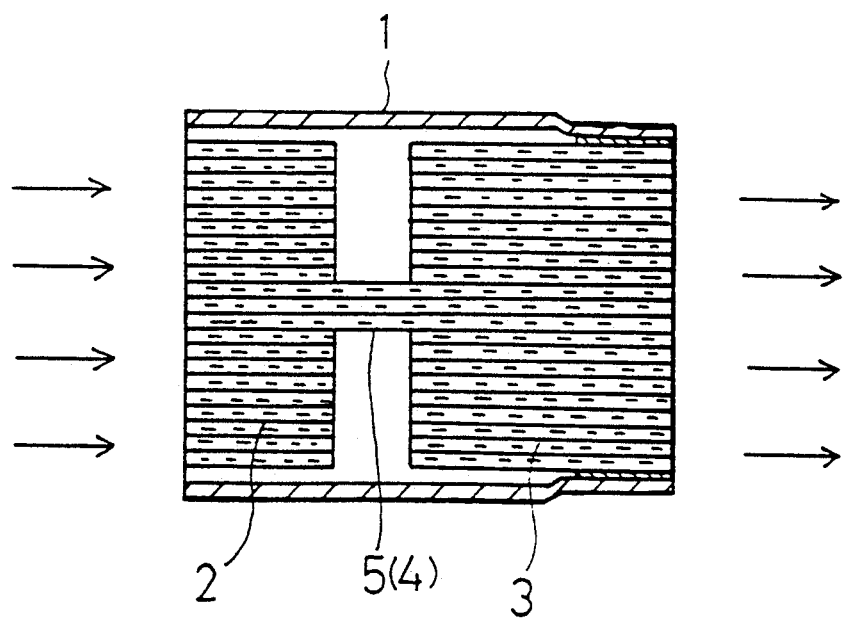
FIG. 6 is a cross section of a support structure of a third preferred embodiment according to the present invention.

FIG. 6 shows a cross section of a support structure according to a third preferred embodiment of the present invention. This support structure is produced to have a similar structure to that of Preferred Embodiment 1 except that a first honeycomb 2 and a second honeycomb 3 are integrally connected by a rod-shaped honeycomb extending between centers of the first honeycomb 2 and the second honeycomb 3. The first honeycomb 2 and the second honeycomb 3 are both 84 mm in diameters and are wound integrally with each other. The connecting part of the sleeve 1 to the second honeycomb 3 has a step shape. Since the rod-shaped honeycomb 5 functions as the holding member 4, the support structure of this preferred embodiment produces similar effects to that of Preferred Embodiment 1.

Figure 7:
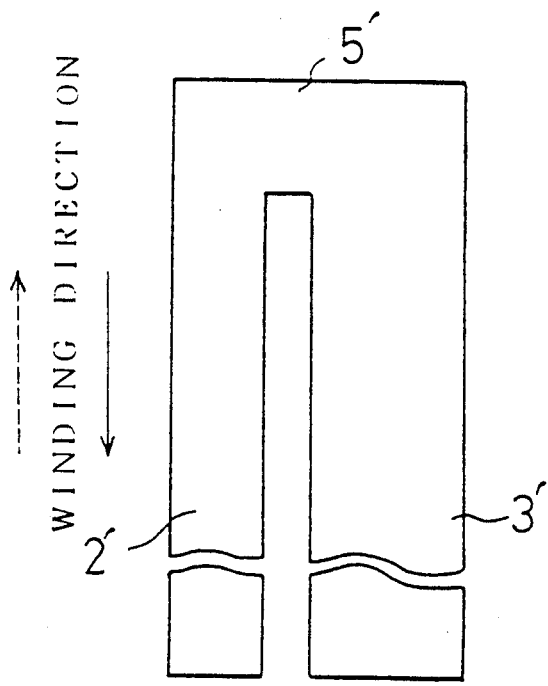
FIG. 7 is a development elevation of honeycombs used in the third preferred embodiment according to the present invention.

These honeycombs 2, 3, 5 are formed by using a foil material comprising a flat plate and a corrugated plate piled on the flat plate. As shown in FIG. 7, the foil material having a shape in which foil materials 2' and 3' are connected to each other at one ends thereof is wound from the connected end to the other separated ends. Thus, the wound connecting part 5' positioned at the center becomes the rod-shaped honeycomb 5 and the other parts serve as the first honeycomb 2 and the second honeycomb 3.

PREFERRED EMBODIMENT 4

Figure 8:
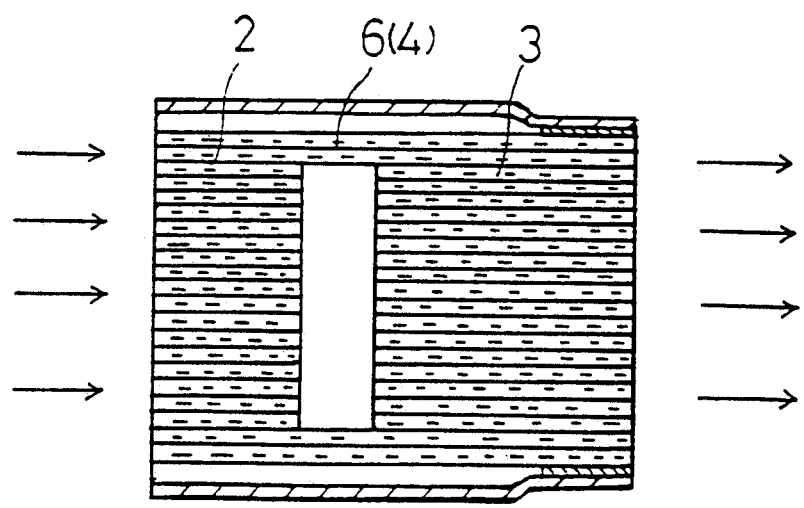
FIG. 8 is a cross section of a support structure of a fourth preferred embodiment according to the present invention.

FIG. 8 shows a cross section of a support structure of a fourth preferred embodiment according to the present invention. This support structure is produced to have a similar structure to that of Preferred Embodiment 3 except that a first honeycomb 2 and a second honeycomb 3 are integrally connected to each other by a cylindrical honeycomb 6 which extends between peripheries of the respective honeycombs. Namely, the cylindrical honeycomb 6 functions as the holding member 4. Since the cylindrical honeycomb 6 connects the first honeycomb 2 and the second honeycomb 3 at the entire circumference, the support structure of this preferred Embodiment has much improved rigidity compared to the support structure connected only at the center according to Preferred Embodiment 3.

These honeycombs are formed by using the same foil material as shown in FIG. 7, and winding the foil material in the opposite direction to that of Preferred embodiment 3, namely from the separated ends to the connecting part 5'. Therefore, a wound connecting part 5' positioned at the periphery functions as the cylindrical honeycomb 6, and the other parts function as the first honeycomb 2 and the second honeycomb 3.

PREFERRED EMBODIMENT 5

Figure 9:
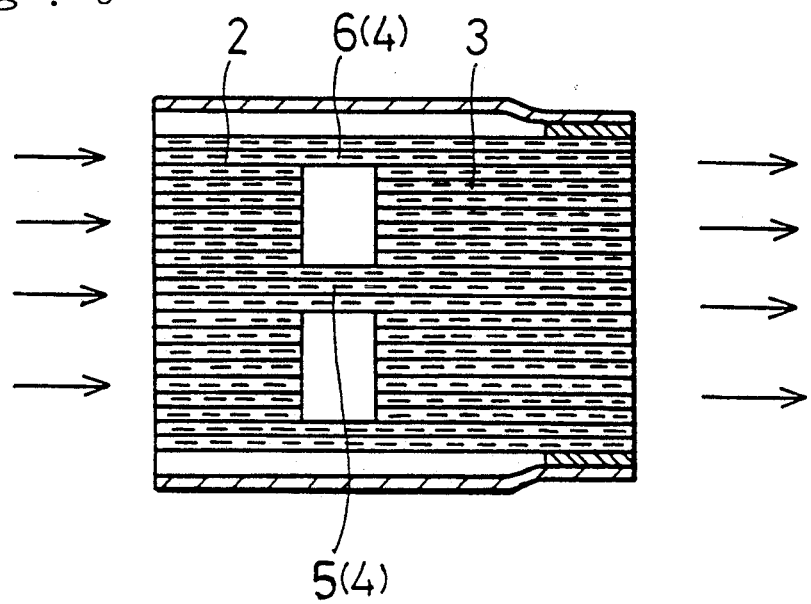
FIG. 9 is a cross section of a support structure of a fifth preferred embodiment according to the present invention.

FIG. 9 shows a cross section of a support structure of a fifth preferred embodiment according to the present invention. This support structure is produced to have a similar structure to that of Preferred Embodiment 3, except that a first honeycomb 2 and a second honeycomb 3 are integrally connected to each other by a rod-shaped honeycomb 5 extending from the center of the first honeycomb 2 to the center of the second honeycomb 3, and a cylindrical honeycomb 6 extending between peripheries of the respective honeycombs. That is, the rod-shaped honeycomb 5 and the cylindrical honeycomb 6 function as the holding members 4 respectively.

Since the first honeycomb 2 and the second honeycomb 3 are connected to each other at both the centers and the peripheries, the support structure of this preferred embodiment has higher rigidity and better durability to those of Preferred Embodiment 3 and Preferred Embodiment 4.

Figure 10:
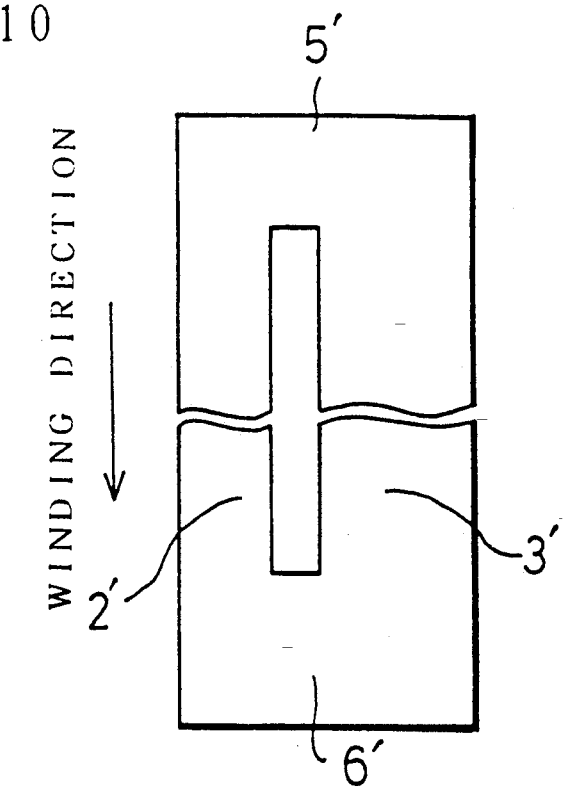
FIG. 10 is a development elevation of honeycombs used in the fifth preferred embodiment according to the present invention.

These honeycombs are formed by using a foil material comprising a flat plate and a corrugated plate piled on the flat plate. As shown in FIG. 10, the foil material having a shape in which foil materials 2' and 3' are connected to each other at both ends is wound from one connected end 5' to the other connected end 6'. Thereby, the wound connecting part 5' positioned at the center becomes the rod-shaped honeycomb 5, and the other wound connecting part 6' positioned at the periphery becomes the cylindrical honeycomb 6. The other parts function as the first honeycomb 2 and the second honeycomb 3.

PREFERRED EMBODIMENT 6

Figure 11:
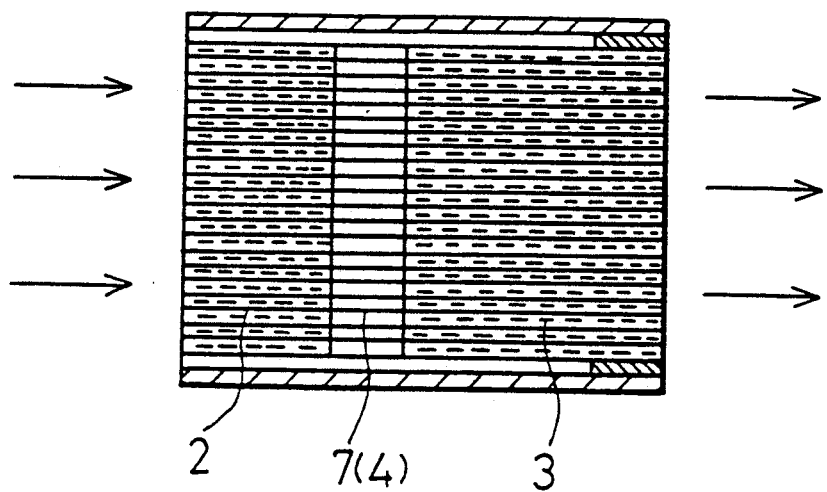
FIG. 11 is a cross section of a support structure of a sixth preferred embodiment according to the present invention.

FIG. 11 shows a cross section of a support structure of a sixth preferred embodiment according to the present invention. This support structure is produced to have a similar structure to that of Preferred Embodiment 1 except that a first honeycomb 2 and a second honeycomb 3 are integrally connected to each other by a cylindrical flat plate part 7 having a spiral cross section. Namely, the cylindrical flat plate 7 functions as the holding member 4.

Figure 12:
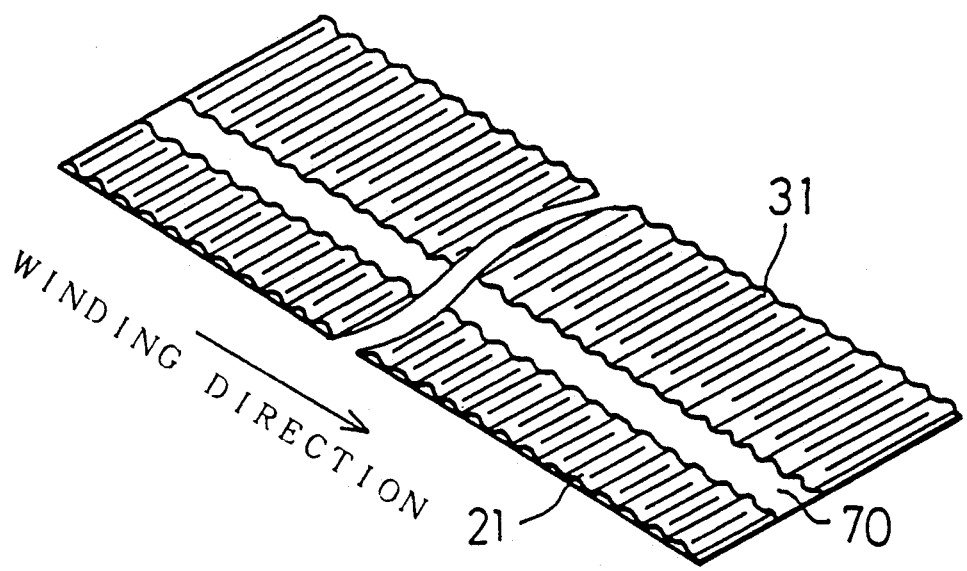
FIG. 12 is a development elevation of honeycombs used in the sixth preferred embodiment according to the present invention.

The first honeycomb 2, the second honeycomb 3 and the cylindrical flat plate part 7 are formed as follows. As shown in FIG. 12, a narrow first corrugated plate 21 and a wide second corrugated plate 31 are piled on a flat plate 70 in a way that the first corrugated plate 21 and the second corrugated plate 31 are in parallel with each other and have a space between themselves, and the piled plates are integrally wound from one end to the other end. Thus, the part positioned between the first corrugated plate 21 and the second corrugated plate 31 and comprising only the flat plate 8 becomes the cylindrical flat plate part 7.

In the support structure of this preferred embodiment, the cylindrical flat plate part 7 has a similar function to the holding member 4 of Preferred Embodiment 1. Further, catalyst metal can be charged also on the cylindrical flat plate part 7, which improves purification efficiency of the entire support structure.

Having now fully described the present invention, it will be apparent to one of ordinary skill in the art that many changes and modifications can be made thereto without departing from the spirit or scope of the present invention as set forth herein.

What is claimed is:

1. A tandem support structure for an exhaust gas purifying catalyst consisting essentially of:
a sleeve;
a first metal honeycomb disposed on an upstream side of exhaust gases in said sleeve; and
a second metal honeycomb disposed on a downstream side of exhaust gases at a position axially separated from said first metal honeycomb in said sleeve,
wherein said second metal honeycomb is fixed to said sleeve at least at a part thereof, and said first metal honeycomb is held by a holding member which axially extends in an upstream direction from said second metal honeycomb, without contacting said sleeve.

2. A tandem support structure for an exhaust gas purifying catalyst according to claim 1, wherein said holding member has a rod shape, and ends of said holding member are respectively connected to a center of said first metal honeycomb and a center of said second metal honeycomb.

3. A tandem support structure for an exhaust gase purifying catalyst according to claim 2, wherein said first metal honeycomb, said second metal honeycomb, and said holding member are formed by disposing two foil materials which respectively comprise a flat plate and a corrugated plate piled on said flat plate in parallel with each other at a distance, connecting said holding member to one end of each of said foil materials, and winding said foil materials around said holding member into rolls.

4. A tandem support structure for an exhaust gas purifying catalyst according to claim 1, wherein the axial direction of said first metal honeycomb is shorter than that of said second metal honeycomb.

5. A tandem support structure for an exhaust gas purifying catalyst according to claim 3, wherein said holding member is a hollow cylindrical rod having a bottomed end.

6. A tandem support structure for an exhaust gas purifying catalyst according to claim 3, wherein a part of said holding member disposed in said second metal honeycomb has a smaller length than that of said second metal honeycomb.

7. A tandem support structure for an exhaust gas purifying catalyst according to claim 1, wherein said holding member is a rod-shaped honeycomb positioned at centers of said first metal honeycomb and said second metal honeycomb, and
said first metal honeycomb, said second metal honeycomb and said holding member are integrally formed by winding in rolls a foil material which comprises a flat plate and a corrugated plate piled on said flat plate and has a shape in which two parallel parts having a space between them are connected to each other at one ends thereof, in a direction from said connected end to separated ends.

8. A tandem support structure for an exhaust gas purifying catalyst according to claim 1, wherein said holding member is a cylindrical honeycomb positioned at peripheries of said first metal honeycomb and said second metal honeycomb, and
said first metal honeycomb, said second metal honeycomb and said holding member are integrally formed by winding in rolls a foil material which comprises a flat plate and a corrugated plate piled on said flat plate and has a shape in which two parallel parts having a space between them are connected to each other at one ends thereof, in a direction from separated ends to said connected end.

9. A tandem support structure for an exhaust gas purifying catalyst according to claim 1, wherein said holding member is a rod-shaped honeycomb extending between centers of said first metal honeycomb and said second metal honeycomb, and a cylindrical honeycomb extending between peripheries of said first metal honeycomb and said second honeycomb, and said first metal honeycomb, said second metal honeycomb and said holding member are integrally formed by winding in rolls a foil material which comprises a flat plate and a corrugated plate piled on said flat plate and has a shape in which two parallel parts having a space between them are connected to each other at both ends thereof.

10. A tandem support structure for an exhaust gase purifying catalyst according to claim 1, wherein said holding member is a cylindrical flat plate part having a spiral cross section, and said first metal honeycomb, said second metal honeycomb, and said holding member are integrally formed by piling a first corrugated plate and a second corrugated plate on a flat plate in a way that said first corrugated plate and said second corrugated plate are in parallel with each other and have a space between themselves, and winding said piled plates from one end to the other end.

* * * * *